(12) United States Patent
Beaulieu et al.

(10) Patent No.: US 10,215,151 B2
(45) Date of Patent: Feb. 26, 2019

(54) AERATING SYSTEM FOR HYDRAULIC TURBINE

(71) Applicant: Alstom Renewable Technologies, Grenoble (FR)

(72) Inventors: Sebastien Beaulieu, Verchères (CA); Michel Sabourin, Sorel-Tracy (CA); Laurent Bornard, Saint-Ours (CA); Guillaume Boutet-Blais, Sorel-Tracy (CA)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 330 days.

(21) Appl. No.: 15/036,693

(22) PCT Filed: Oct. 28, 2014

(86) PCT No.: PCT/EP2014/073138
§ 371 (c)(1),
(2) Date: May 13, 2016

(87) PCT Pub. No.: WO2015/071094
PCT Pub. Date: May 21, 2015

(65) Prior Publication Data
US 2016/0327012 A1 Nov. 10, 2016

(30) Foreign Application Priority Data
Nov. 14, 2013 (EP) .................................... 13290283

(51) Int. Cl.
F03B 3/02 (2006.01)
F03B 11/00 (2006.01)
F03B 3/12 (2006.01)

(52) U.S. Cl.
CPC ............ F03B 11/002 (2013.01); F03B 3/125 (2013.01); F05B 2220/32 (2013.01);
(Continued)

(58) Field of Classification Search
CPC .......... F03B 11/002; F03B 3/125; F03B 3/02; F05B 2220/32; F05B 2220/64; F05B 2240/24; Y02E 10/223; Y02E 10/226
(Continued)

(56) References Cited

U.S. PATENT DOCUMENTS

| 2,622 | A | * | 5/1842 | Woodward | ................ | F03B 3/02 |
| | | | | | | 415/205 |
| 20,456 | A | * | 6/1858 | Tyler | ........................ | F03B 3/02 |
| | | | | | | 415/151 |

(Continued)

FOREIGN PATENT DOCUMENTS

| CA | 2436670 A1 | 2/2005 |
| CN | 201071784 Y | 6/2008 |

(Continued)

OTHER PUBLICATIONS

Unofficial English Translation of Chinese Office Action issued in connection with corresponding CN Application No. 201480062340.5 dated Apr. 5, 2017.

(Continued)

Primary Examiner — Jason D Shanske
Assistant Examiner — Brian Christopher Delrue
(74) Attorney, Agent, or Firm — GE Global Patent Operation; Douglas D. Zhang

(57) ABSTRACT

Aerating system for the runner of a hydraulic turbine, the runner comprising a plurality of blades, such that inter-blade canals are configured between each pair of blades for the admission of air in the water flow circulating through the hydraulic turbine, such that the aerating system comprises at least one hydrofoil located in the inter-blade canal of the runner contacting the pair of blades configuring the inter-blade canal where the hydrofoil is located, such that the hydrofoil has a non-axis symmetrical profile, and such that (Continued)

at least one of the blades in contact with the hydrofoil comprises an aerating canal delivering air to the hydrofoil.

14 Claims, 5 Drawing Sheets

(52) U.S. Cl.
CPC ....... *F05B 2220/64* (2013.01); *F05B 2240/24* (2013.01); *Y02E 10/223* (2013.01); *Y02E 10/226* (2013.01)

(58) Field of Classification Search
USPC .......................................................... 415/116
See application file for complete search history.

(56) References Cited

U.S. PATENT DOCUMENTS

| | | | | |
|---|---|---|---|---|
| 31,961 | A * | 4/1861 | Dripps | F03B 3/02 415/205 |
| 39,783 | A * | 9/1863 | Symonds | F03B 3/02 415/205 |
| 117,193 | A * | 7/1871 | Mooney | F03B 3/02 415/129 |
| 146,068 | A * | 12/1873 | Hamilton | F03B 3/02 416/187 |
| 1,509,653 | A * | 9/1924 | Kaplan | F03B 3/125 415/218.1 |
| 1,514,293 | A * | 11/1924 | Lawaczeck | F03B 3/125 415/218.1 |
| 1,529,456 | A * | 3/1925 | White | F03B 3/125 415/144 |
| 1,942,995 | A * | 1/1934 | Biggs | F03B 3/125 415/115 |
| 2,772,863 | A * | 12/1956 | Harney | F04D 3/005 261/93 |
| 3,797,965 | A * | 3/1974 | Tonooka | F03B 3/121 416/186 R |
| 3,918,627 | A * | 11/1975 | Kawano | F03B 3/121 228/178 |
| 4,158,525 | A | 6/1979 | Kawase et al. | |
| 4,412,779 | A | 11/1983 | Tsunoda et al. | |
| 4,780,051 | A * | 10/1988 | Fisher, Jr. | C02F 3/1294 261/87 |
| 5,879,130 | A * | 3/1999 | Beyer | F03B 3/125 415/115 |
| 5,896,657 | A * | 4/1999 | Beyer | F03B 3/125 29/889.6 |
| 6,135,716 | A * | 10/2000 | Billdal | F03B 3/125 416/183 |
| 6,155,783 | A * | 12/2000 | Beyer | F03B 3/02 29/469.5 |
| 6,524,063 | B1 * | 2/2003 | Beyer | F01D 5/147 415/115 |
| 7,195,460 | B2 * | 3/2007 | Bazin | F03B 3/125 416/223 A |
| 9,175,662 | B2 * | 11/2015 | Bouvet | F03B 3/125 |
| 2004/0265117 | A1 | 12/2004 | Desy et al. | |
| 2005/0242451 | A1 | 11/2005 | Demers et al. | |
| 2006/0115357 | A1 * | 6/2006 | Coulson | F03B 3/125 415/203 |
| 2011/0221198 | A1 | 9/2011 | Evans | |
| 2015/0192101 | A1 * | 7/2015 | Rossi | F03B 3/125 416/186 R |
| 2015/0285207 | A1 * | 10/2015 | De Colombel | F03B 3/02 416/183 |
| 2016/0076508 | A1 * | 3/2016 | Bornard | F03B 3/02 416/131 |
| 2016/0084216 | A1 * | 3/2016 | Bornard | F03B 3/02 60/325 |

FOREIGN PATENT DOCUMENTS

| | | |
|---|---|---|
| CN | 102245893 A | 11/2011 |
| DE | 10122524 A1 | 8/2002 |
| JP | 06185445 A | 7/1994 |
| RU | 2166121 C2 | 4/2001 |
| WO | 2008076630 A1 | 6/2008 |

OTHER PUBLICATIONS

International Search Report and Written Opinion issued in connection with corresponding application PCT/US2014/073138 dated Feb. 4, 2015.

Unofficial English Translation of Russian Office Action issued in connection with corresponding RU Application No. 2016117848 dated Jul. 9, 2018.

* cited by examiner

AERATING SYSTEM FOR HYDRAULIC TURBINE

FIELD OF THE INVENTION

The present invention relates to the design of an aerating system inside the runner of a hydraulic turbine that increases the dissolved oxygen level contained in the water circulating through the hydraulic turbine.

BACKGROUND

It has been observed in the headwater of hydraulic reservoirs in hydro plants, especially in warm climates and in particular with hydraulic reservoirs of more than 15 m deep, that stratification of the headwater in the hydraulic reservoirs occurs, which originates a low dissolved oxygen level in the water. In particular, when the dissolved oxygen level in the water is below 5 mg/l, the aquatic life is directly impacted and the stress level of most fish increases dramatically. In such conditions, air is injected in the water passages of the hydraulic turbine of the hydro plant in order to increase the dissolved oxygen level contained in the water.

There are several techniques already known in the state of the art for injecting air in the water passages of a hydraulic turbine: however, each technique has a limited capacity to inject air in the hydraulic turbine, therefore leading to a different dissolved oxygen enhancement in the water. Furthermore, each of these techniques impacts the water pressure profile and the flow velocity streamlines inside the hydraulic turbine in a different way, which has an effect on turbine performances and characteristics.

Therefore, the existing solutions known in the state of the art injecting air in the water passages of a hydraulic turbine have limited air injection capability and have a high impact on the turbine performance.

The present invention is directed towards improving the above-mentioned existing limitations in the state of the art.

SUMMARY OF THE INVENTION

The present invention relates to the design of an aerating system inside the runner of a hydraulic turbine that increases in an efficient way the dissolved oxygen level contained in the water circulating through the hydraulic turbine, minimizing the impact on the turbine performance.

In particular, in an embodiment, the aerating system of the invention comprises a plurality of hydrofoils located in the inter-blade canals of the water passage of the hydraulic turbine, these inter-blade canals being used for the air admission in the water flow, thus increasing the dissolved oxygen level contained in the water circulating through the hydraulic turbine.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawing, wherein.

DETAILED DESCRIPTION OF THE INVENTION

Figure 1:
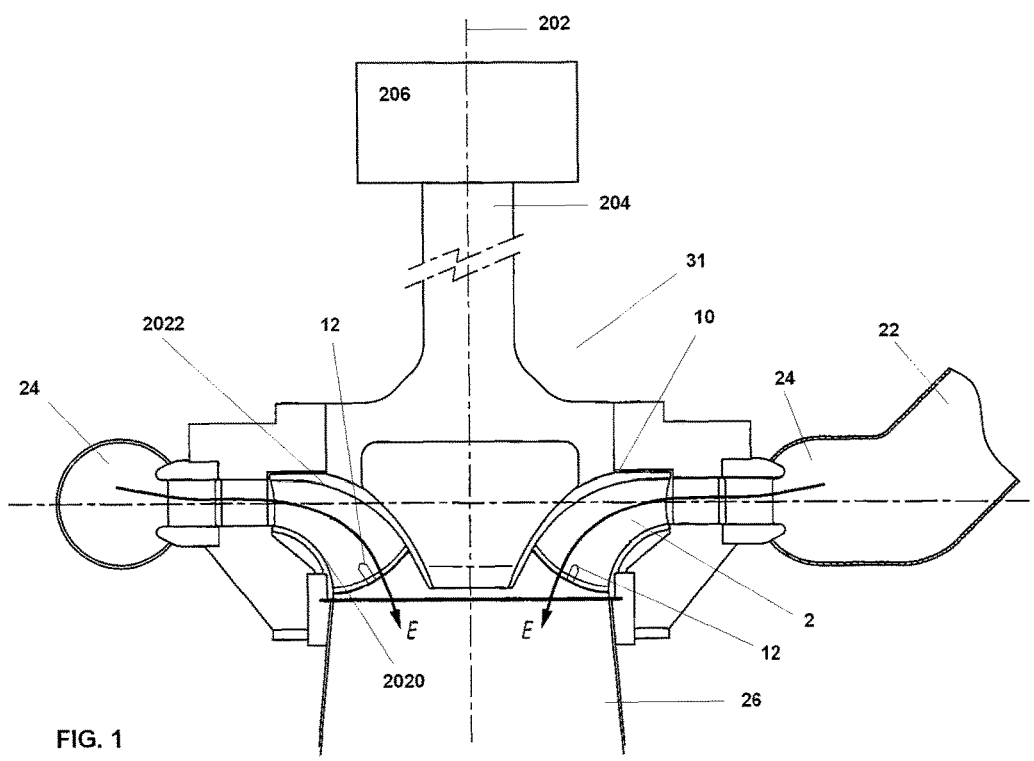
FIG. 1 shows a front view of a typical hydraulic turbine comprising a plurality of blades defining inter-blade canals where a plurality of hydrofoils will be located for configuring an aerating system, according to the present invention.
Figure 2:
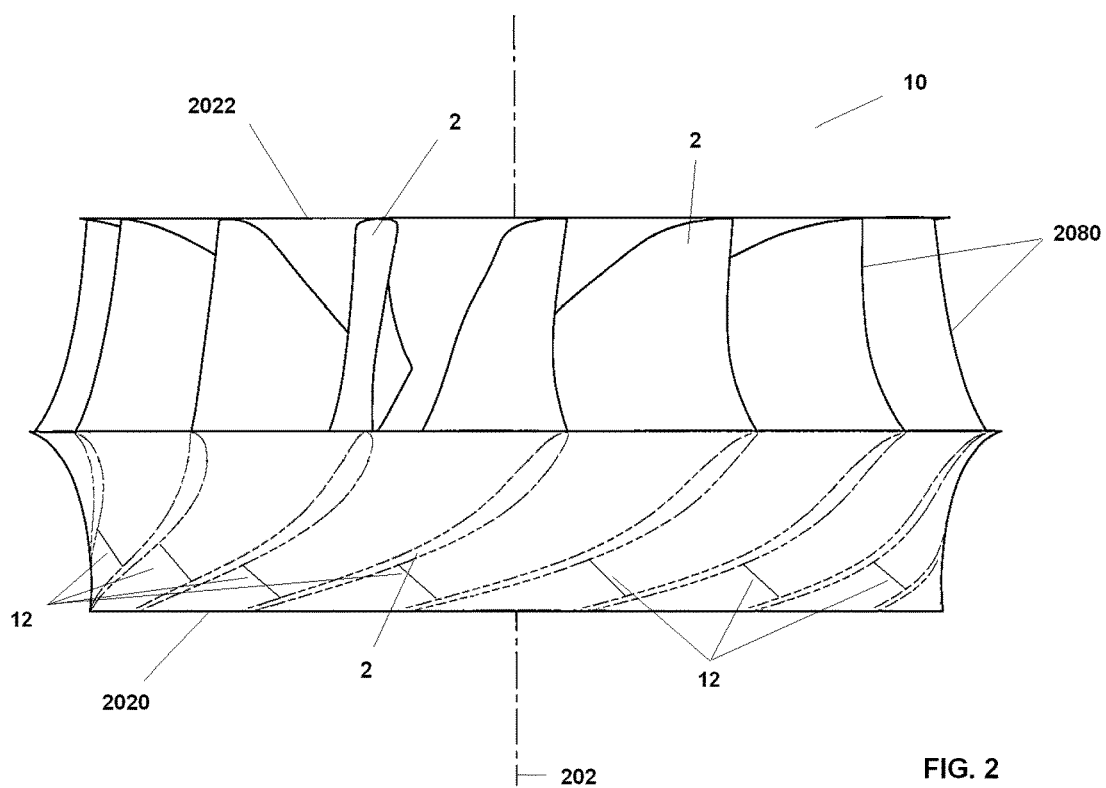
FIG. 2 shows a side view of the runner in a typical hydraulic turbine such as the one shown in FIG. 1, comprising inter-blade canals where a plurality of hydrofoils will be located for configuring an aerating system, according to the present invention.
Figure 3:
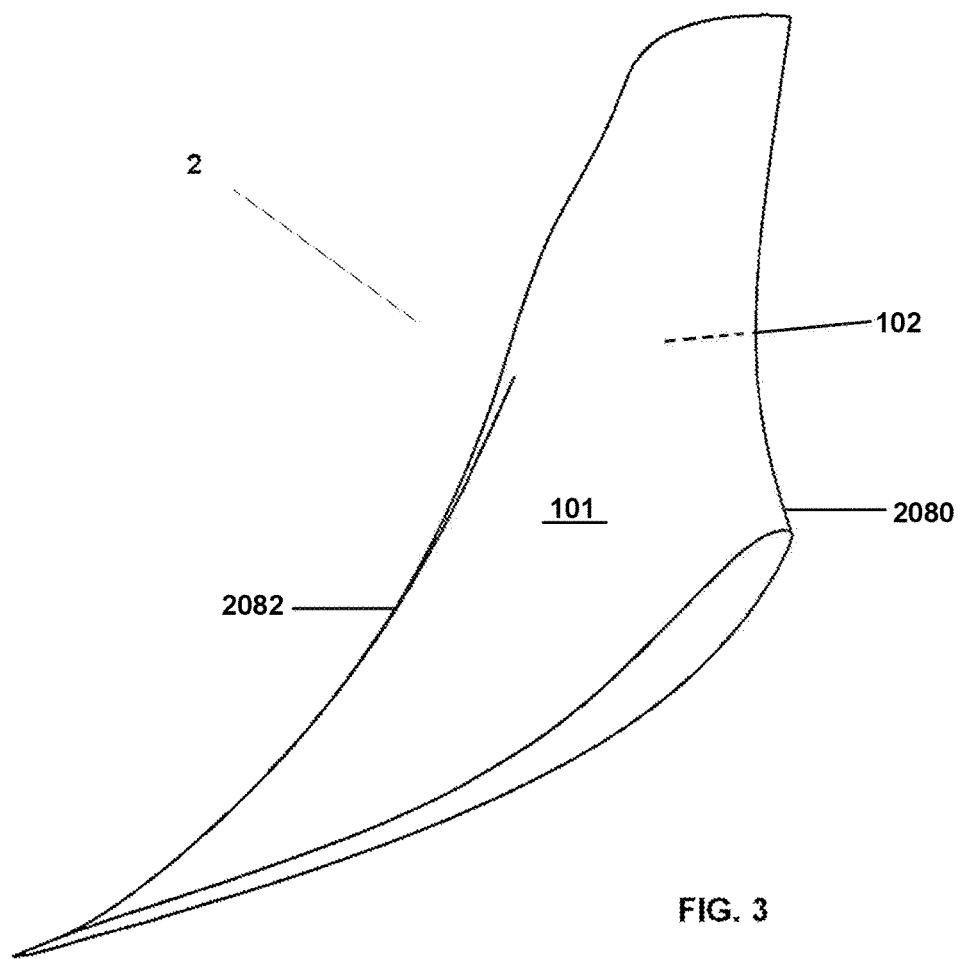
FIG. 3 shows a detailed view of the blades in a typical hydraulic turbine of any of FIG. 1 or 2.
Figure 4:
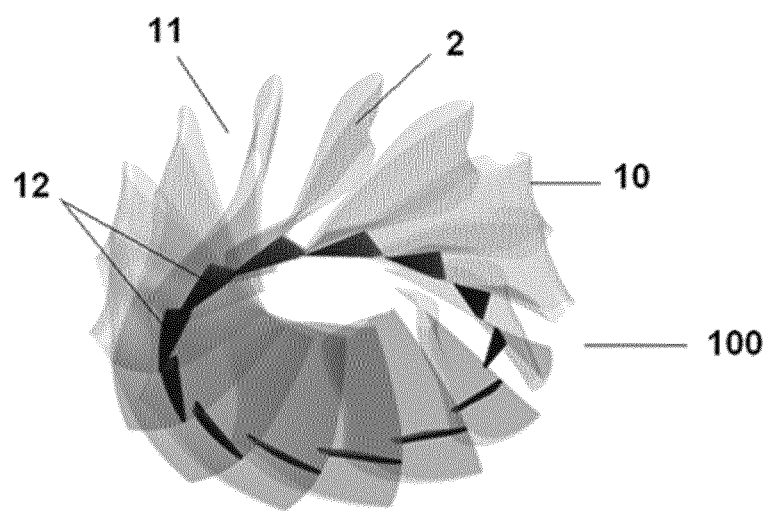
FIG. 4 shows a 3D view of a runner of a hydraulic turbine with the aerating system comprising a plurality of hydrofoils located in the inter-blade canals, according to the present invention.
Figure 5:
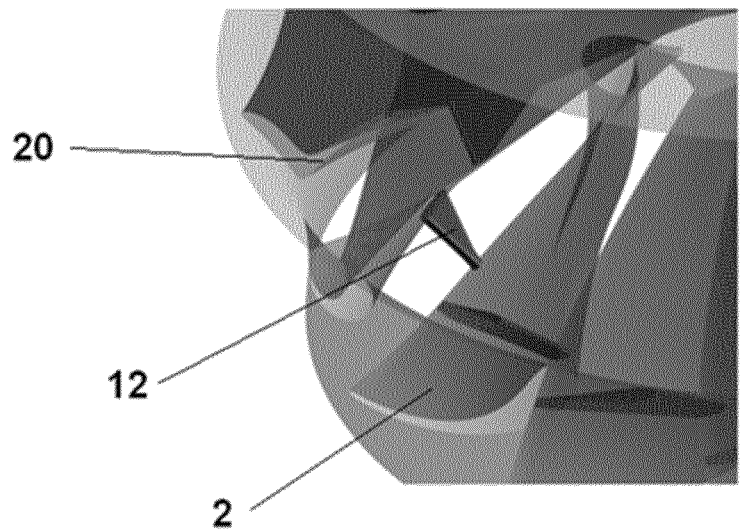
FIG. 5 shows a detailed view of the inter-blade hydrofoils in the aerating system in the runner of a hydraulic turbine, according to the present invention.
Figure 6:
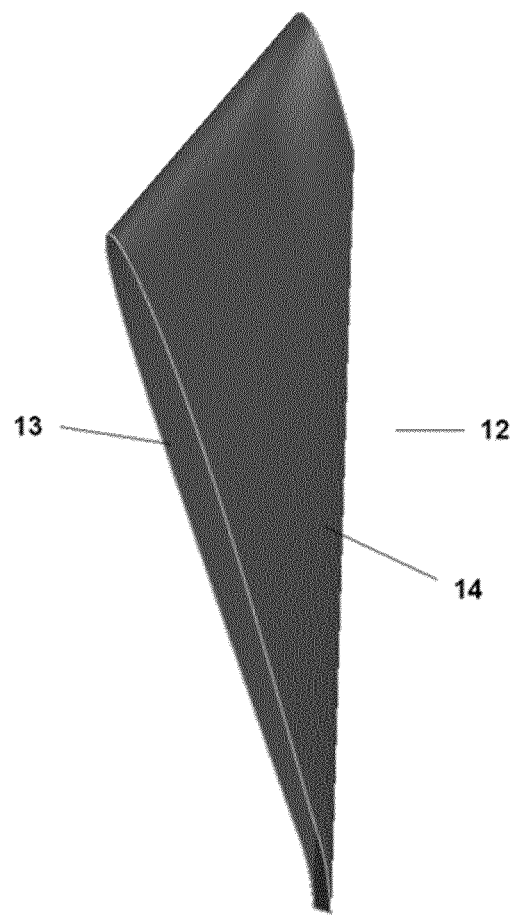
FIG. 6 shows a detailed view of the hydrofoil design in the aerating system in the runner of a hydraulic turbine, according to the present invention.

FIG. 1 shows an installation for the conversion of energy according to the present invention. This installation comprises a hydraulic turbine 31 that, in FIG. 1, is a Francis turbine. The rotating part of the hydraulic turbine 31 is a runner 10, in this FIG. 1, of the Francis type. This runner 10 rotates around a vertical axis 202, driving the rotation of a drive shaft 204. The drive shaft 204 is linked to a generator 206 for producing electricity. However, it is also possible to use the mechanical energy produced for driving another device. The water is stored upstream in a water reservoir not shown in FIG. 1. Water is then provided into the hydraulic turbine 31 via a pressure pipe 22 having a drop height defined by the difference in elevation between the water reservoir and the hydraulic turbine 31. The pressure pipe 22 ends into a cover 24 which surrounds the runner 10 and allows distributing water substantially uniformly around the vertical axis 202 within the runner 10. More specifically, the water flows between the runner blades 2 that are arranged between a crown 2022 and a band 2020 in the runner 10. Each of these blades 2 comprises a leading edge 2080 against which the water comes from the cover 24 and a trailing edge 2082 from which water escapes into a draft tube 26. The blades 2 have an asymmetric profile with a lower surface and an upper surface. The direction of flow of water through the hydraulic turbine 31 is shown in FIG. 1, by arrows E.

The present invention relates to an aerating system 100 in the runner 10 of a hydraulic turbine. The aerating system 100 of the invention comprises a plurality of hydrofoils 12 located in the inter-blade canals 11 of the water passage of the hydraulic turbine, these inter-blade canals 11 being used for the air admission in the water flow, thus increasing the dissolved oxygen level contained in the water circulating through the hydraulic turbine. The aerating system 100 of the invention is shown in FIGS. 1 to 6.

The hydrofoils 12 of the aerating system 100 of the invention are located inside the inter-blades canals 11 of the runner 10. Each hydrofoil 12 is connected to the pressure side 101 of the inter-blade canals 11 or to the suction side 102 of the inter-blade canals 11 or to both sides 101 and 102, of the inter-blade canals 11. According to the invention, it is necessary that at least one of the blades 2 of the runner 10 that is in contact with the hydrofoil 12 comprises an aerating canal 20 to deliver air to the hydrofoil 12. This canal 20 can either connect an air inlet at the runner crown or the runner band to the hydrofoil. The profile of the hydrofoil 12 of the invention is non-axis symmetrical. The hydrofoil 12 can be made from two plates 13 and 14 with a free passage in between, or can be made from one plate having aerating canals inside to allow air admission at the hydrofoil 12 trailing edge or at one of its sides.

The hydrofoil 12 is located inside the inter-blades canal 11 where the water flow conditions best optimize the natural air admission and dissolved oxygen enhancement, for the turbine operating point.

It is possible to use one or several hydrofoils 12 in a turbine runner 10. It is possible to use the same hydraulic profile for all the hydrofoils 12 or several different hydraulic profiles. It is possible to locate all the hydrofoils 12 at the same elevation inside the inter-blades canal 11 or at different elevations depending of the expected characteristics. It is possible to use one or several hydrofoils 12 at different elevation in a same inter-blades canal 11. All these characteristics configure the different embodiments of the system of the invention.

In an embodiment, the chord of the hydrofoil is longer on the side where it connects to the aerating canal 20 and its length decreases through the inter-blade canal 11 in order to minimize friction losses.

The proposed solution according to the invention results in a distributed aerating system 100 that can be located exactly where the air admission is the most efficient for the considered operating condition of the hydraulic turbine. The outlet of the runner 10 is an appropriate location that allows good mixing between air and water; furthermore, the air admission system efficiency increases when the water pressure at the injection location is low. The pressure at the runner outlet varies in azimuth from the suction side 102 of the inter-blades canals 11 to the pressure side 101 of the inter-blade canals 11 and in the meridian view from the band side to the crown side. The proposed aerating system 100 is the only one that allows air admission in the inter-blades canals 11, from any optimized location on the suction side 102 to any optimized location on the pressure side 101.

The proposed design is an appropriate solution which satisfies the dissolved oxygen enhancement market demands at present. It mainly concerns Francis turbines but it could also be considered for Propeller turbines.

Although the present invention has been fully described in connection with preferred embodiments, it is evident that modifications may be introduced within the scope thereof, not considering this as limited by these embodiments, but by the contents of the following claims.

What is claimed is:

1. An aerating system for the runner of the hydraulic turbine, the runner comprising a plurality of blades, such that inter-blade canals are configured between each pair of blades for the admission of air in the water flow circulating through the hydraulic turbine, wherein the aerating system comprises at least one hydrofoil located in the inter-blade canal of the runner and contacting the pair of blades configuring the inter-blade canal where the hydrofoil is located, such that the hydrofoil has a non-axis symmetrical profile, and such that at least one of the blades in contact with the hydrofoil comprises an aerating canal delivering air to the hydrofoil.

2. The aerating system according to claim 1 wherein the aerating canal is delivering air from a runner crown of the runner to the hydrofoil.

3. The aerating system according to claim 1 wherein the aerating canal is delivering air from a runner band of the runner to the hydrofoil.

4. The aerating system of claim 1 further comprising an electronic device controlling the air flow through the aerating system.

5. The aerating system of claim 1 wherein the hydrofoil comprises two plates and a free passage in between to allow the admission of air.

6. The aerating system of claim 1 wherein the hydrofoil comprises one plate and also comprises a plurality of aerating canals inside to allow the admission of air.

7. The aerating system of claim 1, wherein the system comprises a plurality of hydrofoils, each one having a different hydraulic profile.

8. The aerating system of claim 1, wherein the system comprises a plurality of hydrofoils, all of them having the same hydraulic profile.

9. The aerating system of claim 1, wherein the system comprises a plurality of hydrofoils, all of them located at the same elevation in the inter-blade canals, with respect to the runner.

10. The aerating system of claim 1, wherein the system comprises a plurality of hydrofoils, all of them located at different elevations in the inter-blade canals, with respect to the runner.

11. The aerating system of claim 1, wherein the system comprises a plurality of hydrofoils, all of them located at different elevations with respect to the runner, in one single and the same inter-blade canal.

12. A hydraulic turbine comprising the aerating system of claim 1.

13. An aerating system comprising:
at least one hydrofoil located in an inter-blade canal of a runner of a hydraulic turbine, the inter-blade canal defined between a pair of blades of the runner and configured for the admission of air in a water flow circulating through the hydraulic turbine, wherein the at least one hydrofoil contacts the pair of blades and has a non-axis symmetrical profile, and wherein at least one of the blades in contact with the at least one hydrofoil comprises an aerating canal configured to deliver air to the hydrofoil.

14. A hydraulic turbine comprising:
a runner having a pair of blades that define an inter-blade canal therebetween for the admission of air in a water flow circulating through the hydraulic turbine; and
at least one hydrofoil located in the inter-blade canal and contacting the pair of blades, the at least one hydrofoil having a non-axis symmetrical profile;
wherein at least one of the blades in contact with the at least one hydrofoil comprises an aerating canal configured to deliver air to the hydrofoil.

* * * * *